May 22, 1962 R. E. KOEPPEN 3,035,520

INERTIA ACTUATED ELECTRIC UNIT

Filed Jan. 24, 1955

INVENTOR.
ROBERT E. KOEPPEN
BY

United States Patent Office 3,035,520
Patented May 22, 1962

3,035,520
INERTIA ACTUATED ELECTRIC UNIT
Robert E. Koeppen, Milwaukee, Wis., assignor, by mesne assignments, to the United States of America as represented by the Secretary of the Army
Filed Jan. 24, 1955, Ser. No. 483,607
3 Claims. (Cl. 102—70.2)

This invention relates to improvements in an inertia type electric generator and switch unit for energizing a known electric circuit and in which the generator and switches are to energize the circuit whenever subjected to a particular set of conditions and are not to be affected by any other set of conditions.

When an electric or electronic circuit is to be energized or controlled by an electric impulse, as is the case in the electrical circuit of a projectile fuse, the detonator and its energizing mechanism are subjected to high accelerations so that a so-called "inertia" electric generator can be used as a source of the electric impulse. To secure satisfactory operation of an inertia electric generator in providing power for a fuse circuit, the one magnetic member of the generator should be free for movement at all times (as opposed to the need for release of some holding device by a person) relative to the other generator portions to avoid blocking or restraining of relative movement of the parts, when desired.

By use of an unimpeded and unrestrained inertia generator, a source of power is always available whenever conditions are such as to cause operation of the balance of the "arming" mechanism of the projectile. But the inertia generator will function whenever the projectile is subjected to shock as by accidentally dropping the projectile during handling. In a projectile fuse mechanism, the inertia generator charges a capacitor and it is necessary to provide means permitting any number of successive capacitor charging actions, without effect on the balance of the fuse mechanism excepting under conditions which cause functioning of the other portions of the fuse mechanism. The capacitor charge must be dissipated between charging actions (by slow leakage) but no discharging action whatever can be allowed to occur.

It is therefore one object of the present invention to provide means responsive only to a particular set of conditions affecting the means, for producing a unidirectional electrical impulse energizing or controlling energization of an electric circuit.

Another object of the present invention is to provide an inertia type electrical generator and switch unit for energizing and controlling energization of an electric circuit, which may cooperate with other mechanism and which is always responsive to given acceleration conditions of the unit.

Another object of the invention is to provide a unit combining an inertia type electrical generator with a plurality of switches in which the generator armature is free at all times to move upon acceleration of the unit above a given value and for a given time, and such movement sequentially operates the switches to control transmission of an electrical impulse from the generator to a capacitor serving as the power supply to mechanism for exploding a projectile.

Other advantages and objects than those above set forth will be apparent from the following description when read in connection with the accompanying drawings in which.

Figure 1:
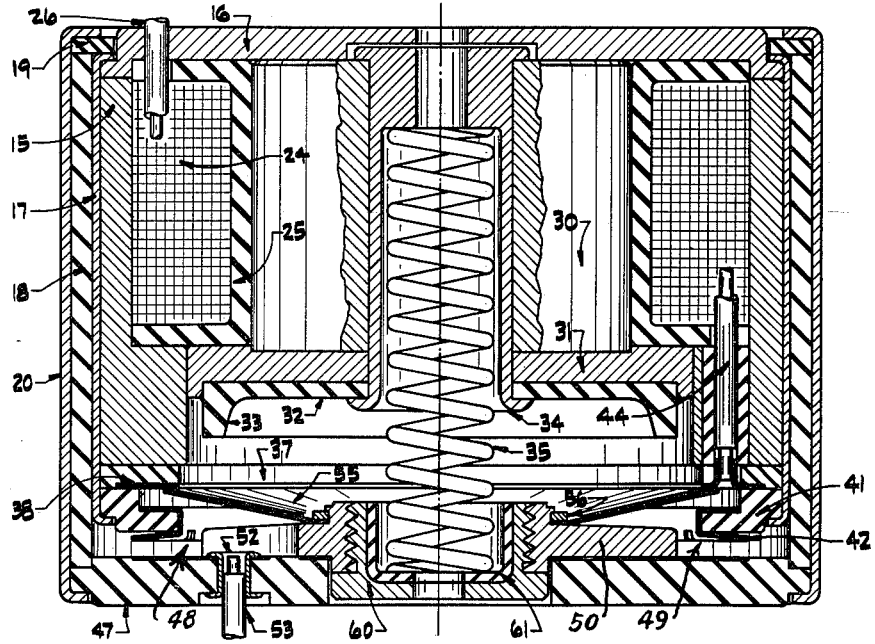
FIG. 1 is a section axially (along the axis of movement of the unit) of a combined inertia electric generator and switches controlling transmission of an electrical impulse from the generator to an electric circuit to be energized by the electric impulse.

Generally, the present structure includes a magnetic yoke on which are mounted a winding with a magnetic armature acting within the winding. The magnetic armature is normally retained in one position by a spring and the magnetic attraction of the yoke, and acts upon a plurality of switches when acceleration of the device in one direction overcomes the action of the spring and the magnetic attraction. When the present unit is used to energize the fuse circuit of a projectile, the switches open or close in a predetermined sequence automatically during a particular degree of acceleration of the device to allow charging of a capacitor (which is a portion of the electrical circuit of the fuse) by the electrical impulse and discharging thereof to energize an electric circuit such as the fuse circuit of a projectile, which circuit is known and therefore not illustrated or described herein.

Referring to the drawings in which like reference numerals refer to like parts, 15 designates a magnetic or magnetically permeable member which is generally of hollow cylindrical shape with an internal shoulder, and with which a magnetically permeable end plate 16 coacts to form the yoke of the generator. A housing 17 partially encloses the yoke and engages the end plate 16 by means of one internal flange, another internal flange on the housing performing another function to be later described. A spacer 18 of insulating material surrounds the housing 17 and has an insulation washer 19 mounted on one end thereof to space and insulate a generator housing 20 from the yoke plate 16. The shoulder in the inside surface of yoke member 15 receives a winding 24 on an insulation bobbin 25 of a size to fit closely into and be retained in a recess formed by the yoke shoulder and the yoke end plate. An insulated electrical lead 26 to the winding 24 extends through the yoke end plate.

A magnetic armature is formed by a core member 30 and a plate 31, which have an easily sliding fit respectively in the winding bobbin and on a surface of the yoke member 15. Hence, the armature is guided and centered in its movements by the bobbin and the yoke. An insulating plate 32 with a peripheral flange 33 from one side of the plate is placed within a recess cut into the armature plate 31. The armature plate 31 and the insulating plate 32, 33 are held on the armature core 30 by a thimble rivet 34 which is formed at its ends over the core 30 and the two plates 32, 33. The rivet forms a seat for a helical compression spring 5 extending beyond one end of the rivet.

Figure 2:
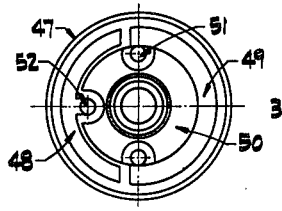
FIG. 2 is a plan view of one sub-assembly of the present device, which provides portions of the electric circuit.
Figure 2A:
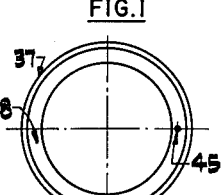
FIG. 2a is a plan view of another sub-assembly forming a portion of the electrical circuit of the device.
Figure 3:
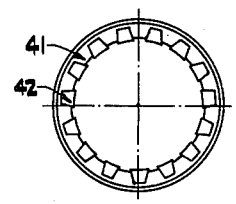
FIG. 3 is a plan view of another sub-assembly of the present device, which provides a multiple contact portion of one of the switches.

A ring 37 (see FIG. 2a) of insulating material carries an annular conductor which may be inlaid into the ring, or formed as a coating on the ring or otherwise, as is well known to form light conductive parts. Such ring and its conductor form a contact ring for one of two switches. Another switch is formed in part by a contact ring comprising an insulating ring 41 (see FIG. 3) on which is mounted a metallic member providing a plurality of resilient contact fingers 42. It will be noted that the insulating ring 37 is substantially annular in cross-section while the insulating ring 41 is substantially Z-shaped in cross-section whereby both rings may be retained in a given relation to the end of the yoke 15, 16 by a flange on the core housing 17. An insulating lead 44 extends through a portion of the yoke 15 for connecting an end of the winding 24 with the conductor 38 of the one contact ring as indicated at 45 in FIG. 2a.

An end plate 47 is held between the end of the spacer 18 and a flange on the generator housing 20 and is in spaced relationship to the switch contact rings 37, 38 and 41, 42. The end plate 47 thus co-acts with parts previously described in defining a cavity at one end of the yoke and into which the armature may move. The end plate 47 has two conductors 48 and 49 fixed or formed thereon, both such conductors being arcuate in shape, and the plate has a relatively heavy cross-section base ring 50 fastened thereto by eyelet rivets 51. An eyelet 52 extending through the plate 47 provides for passage of a lead 53 for connection with conductor 48. The base ring 50 provides a ledge on which is mounted an electrically conductive and resilient member 55 which is generally in the form of a hollow truncated cone known to the trade as a "Belleville washer." The conic contact 55 is held at its inner periphery, on the ring 50 by a retainer ring 56 over which an edge of the base ring 50 is formed to hold the retainer ring. A cap nut 60 is threaded into the ring 50 and receives cup-shaped insulator 61 for seating and reacting against one end of the spring 35 and urging the armature 30, 31 toward the yoke end plate 16.

Figure 4:
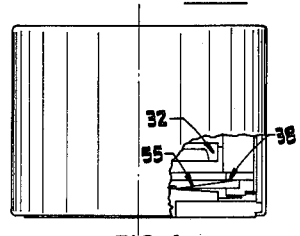
FIG. 4 is an elevation of the device with a portion broken away to show diagrammatically the positioning of the parts in one operation condition of the device.
Figure 5:
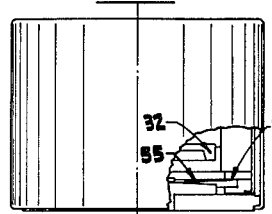
FIG. 5 is an elevation of the device with a portion broken away to show diagrammatically the position of the parts in another operating condition.
Figure 6:
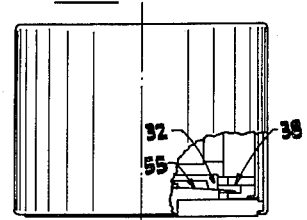
FIG. 6 is an elevation of the device with a portion broken away to show diagrammatically the position of the parts in a third operating condition.
Figure 7:
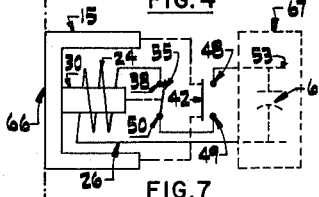
FIGS. 7, 8 and 9 are electrical diagrams showing the action of the electrical parts in the several positions shown in FIGS. 4, 5 and 6.
Figure 8:
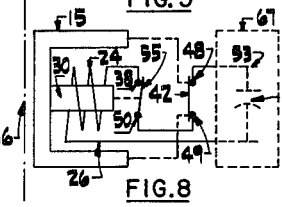
Figure 9:
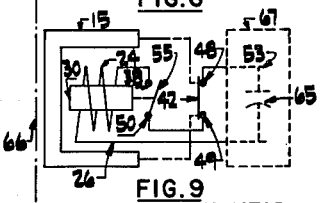

The purpose of the present device is to charge a capacitor designated 65 in FIGS. 7, 8 and 9, above a given limit of a particular set of conditions only and to prevent discharge thereof, the several stages of positions of the switch parts being shown in their mechanical (spatial) positions in FIGS. 4, 5 and 6 while the electrical circuits controlled by the switches are shown in the corresponding diagrams of FIGS. 7, 8 and 9. The numerals applied to the mechanical parts are also applied to the representations of the like parts in the diagram.

FIGURES 1, 4 and 7 show the positions of the parts at starting when the generator armature is under spring action and magnetic attraction by the yoke and before movement of the entire unit, or relative movement of the yoke and armature, have taken place, so that the unit and the various parts thereof are substantially in the original position indicated by line 66 in the electrical diagrams. A first switch includes contact fingers 42 and conductors 48 and 49 while a second switch includes conductor 38, conic member 55, and conductor 49. The fingers 42 do not now bear on conductors 48, 49 and the first switch is therefore open. Member 55 is now in its normal unstressed condition in which it is concave on its side toward the disconnect plate 32, 33 and the outer peripheral portion of such member bears on conductor 38 so that the second switch is closed. It will be seen (FIG. 7) that no circuit is yet completed to the capacitor 65.

FIGS. 5 and 8 show the condition of the unit after acceleration has begun but has not yet reached the given value. The acceleration acts on the entire unit and the entire generator yoke, core and armature moves axially or endwise to bring the switch fingers 42 into position to bridge conductors 48 and 49. Closing of first switch 42, 48 and 49 connects to the capacitor 65 through the leads 26 and 53.

FIGS. 6 and 9 show the final position of the parts in which the generator armature 30, 31 has moved relative to the generator yoke and produced an electrical impulse to charge the capacitor 65. Generation and transmission of the impulse occurs substantially instantaneously and at a predetermined value of acceleration. When the spring resistance and magnetic attraction are overcome, the armature moves sufficiently to press disconnect plate 32, 33 on conic member 55 with sufficient force to flex such member into concave form in the direction opposite to that shown in FIGS. 1 and 4. The outer edge of the conic contact member 55 therefore leaves conductor 38 which opens the second switch.

When the projectile and unit decelerate below the given value of force required to bring about the actions and connections shown in FIGS. 5–9, the spring force and magnetic attraction of the yoke force the armature back to its original position relative to the yoke. Thereafter the entire generator is forced back to its original position which reopens switch 42, 48, 49. Pressure on the conic member 55 is relieved and it snaps back to its original position reclosing switch 38, 55. Closing of the latter switch occurs only after switch 42, 48, 49 has re-opened. Therefore, the mechanism is returned to its original position without affecting the charged condition of capacitor 65. Hence the unit is again in condition for operation if it is accelerated above the given value.

When the unit is used in a projectile, the above sequence of actions takes place if the projectile is accidentally dropped. But the fuse circuit is not energized, the balance of the "arming" mechanism does not operate, and the detonator of the projectile cannot be set off. The charge of the capacitor leaks off slowly unless the projectile is fired so that another impulse is given. Upon firing, the capacitor is re-charged and it is then possible to energize the fuse circuit as other mechanism is now positioned to close the circuit.

Tests have shown that the present unit (with given size and proportions of parts), will operate as above described at accelerations of fifty to one hundred times gravity and within a time of the order of milli-seconds. When the present device is therefore applied to a projectile fuse circuit, the projectile cannot be accidentally armed by dropping or otherwise jarring the projectile in handling. It will be understood that the portions of the fuse circuit symbolized by the rectangle 67, are already in use and are not a part of the present device.

Although but one embodiment of the present invention has been illustrated and described, it will be apparent to those skilled in the art that various changes and modifications may be made therein without departing from the spirit of the invention or from the scope of the appended claims.

I claim:
1. In an ordnance projectile, a power-supply system comprising: a capacitor; a coil; a ferromagnetic body coaxial with said coil and adapted to move axially in response to projectile acceleration of sufficient amplitude; means for limiting the forward and rearward travel respectively of said body in relation to said coil; spring bias means for holding said body in the forwardmost position in the absence of projectile acceleration, said spring bias means adapted to permit said body to move to the rearwardmost position in response to projectile acceleration of sufficient amplitude and duration and to return said body to the forwardmost position upon cessation of acceleration; first and second switches in series between said coil and said condenser, said coil being connected across said condenser only when both said switches are closed, said first and second switches being in the open and closed conditions respectively when the projectile is at rest; first switch-actuating means for closing said first switch when the projectile acceleration attains a first value and for thereafter opening said first switch when the projectile acceleration falls below a second value; second switch-actuating means for opening said second switch when the projectile acceleration attains a third value and for thereafter closing said second switch when the projectile acceleration falls below a fourth value, said third value being greater than said first value and said fourth value being less than said second value.

2. The invention according to claim 1, there being additionally provided: a second ferromagnetic body holding said first-mentioned ferromagnetic body in said forwardmost position by magnetic attraction until projectile acceleration attains a critical value.

3. The invention according to claim 2, said coil and said first-mentioned ferromagnetic body being part of an assembly adapted to move axially as a unit, said first switch being actuated by motion of said assembly as a unit and said second switch being actuated by motion of said first-mentioned ferromagnetic body relative to said coil.

References Cited in the file of this patent

UNITED STATES PATENTS

| 1,711,693 | Ruhlemann | May 7, 1929 |
| 1,755,023 | Ruhlemann | Apr. 15, 1930 |

FOREIGN PATENTS

| 847,119 | Germany | Aug. 21, 1952 |